United States Patent [19]

Merrell

[11] 4,160,993
[45] Jul. 10, 1979

[54] VIR LINE RECOGNITION SYSTEM
[75] Inventor: Richard G. Merrell, Darien, Ill.
[73] Assignee: Zenith Radio Corporation, Glenview, Ill.
[21] Appl. No.: 859,631
[22] Filed: Dec. 12, 1977
[51] Int. Cl.$^2$ ............................................. H04N 9/12
[52] U.S. Cl. ................................................. 358/21 V
[58] Field of Search ................................... 358/10, 28

[56] References Cited
U.S. PATENT DOCUMENTS

| 3,867,010 | 2/1975 | Rzeszewski | 358/10 |
| 4,089,025 | 5/1978 | Banker et al. | 358/10 |

Primary Examiner—Robert L. Richardson

[57] ABSTRACT

A television receiver includes a recognition system identifying the 19th horizontal scanning line of each field of a transmitted television signal for coupling a vertical interval reference (VIR) signal to suitable signal processing circuitry within the receiver. The recognition system includes a timing circuit defining a pair of predetermined timing intervals in each horizontal scanning line during which the logical characteristics of the composite sync signal are sampled and interrogated. A counter is advanced to a preselected state in response to the samples exhibiting a predetermined sequence of logical characteristics occurring during the vertical sync pulse and its associated following equalizing pulse interval. Subsequently, horizontal flyback pulses are counted and the output of the counter is decoded for identifying the 19th horizontal scanning line. A carryover circuit is provided for rendering line 19 identifications for fields during which the predetermined sequence is unsatisfied in accordance with the last line 19 identification corresponding to a satisfaction of the sequence.

19 Claims, 9 Drawing Figures

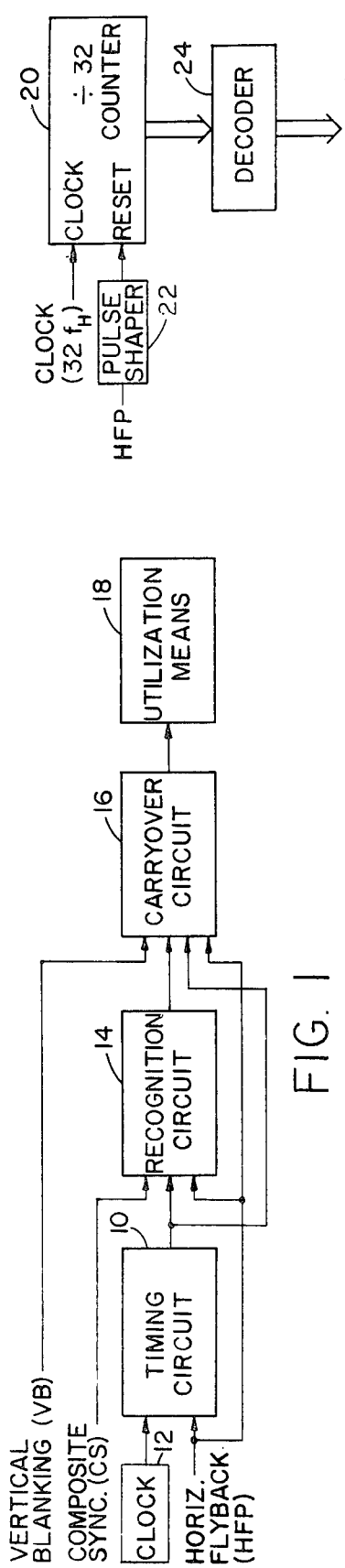
FIG. 1
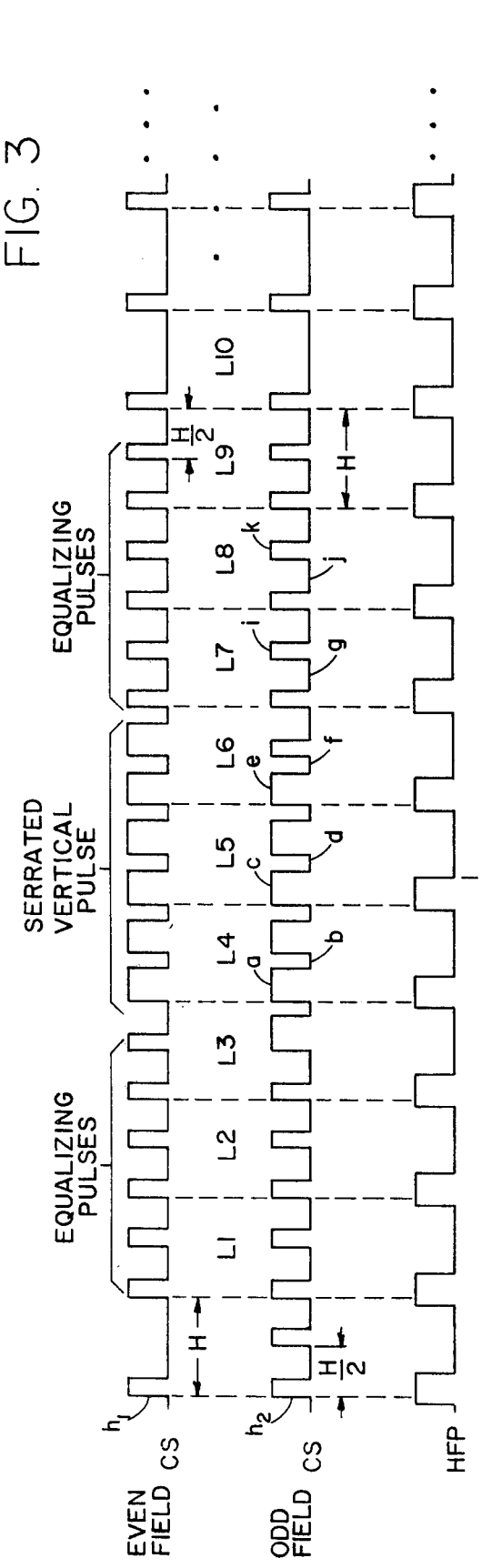
FIG. 3
FIG. 2

4,160,993

VIR LINE RECOGNITION SYSTEM

BACKGROUND OF THE INVENTION

The present invention relates in general to improvements in television receivers and more particularly to a novel circuit arrangement for identifying the horizontal scanning line of a transmitted signal containing a vertical interval reference signal.

Recently, the 19th horizontal scanning line of each field of video information of a transmitted television signal has been used to transmit a specified vertical interval reference (VIR) signal. The specified VIR signal contains components; namely, a chroma reference component, a luminance reference component and a black level reference component, enabling suitable signal processing circuitry within the television receiver to adjust or control the receiver's signal reproducing circuitry for optimizing the characteristics of the displayed image in response thereto. In particular, the VIR signal provides a facility for the automatic adjustment of the displayed image to compensate for imperfections in a received television signal in accordance with the chroma, luminance and black level reference components. Thus, it will be appreciated that a useful VIR control system must perform two essential tasks. Initially the system must include a capability for recognizing or identifying line 19 of each field of transmitted video information. Secondly, the components of the VIR signal on line 19 must be appropriately gated to suitable signal processing circuitry for controlling the receiver's image reproducing circuitry. It is to the former of these functions, i.e. line 19 recognition, that the present invention is largely directed.

Typical prior art line 19 recognition systems comprise a counter having an input connected for counting the horizontal flyback pulses developed in the horizontal deflection system of the receiver. Since each horizontal scanning line corresponds to one horizontal flyback pulse, the count developed by the counter can be conveniently decoded for identifying line 19. A major problem encountered by prior art systems of the foregoing type is that of repeatably initiating the counting sequence at corresponding times during each field of the transmitted television signal to insure a reliable line 19 recognition capability. In this regard, it will be appreciated that initiating the counting sequence with non-corresponding horizontal flyback pulses for successive fields of the television signal will result in inconsistent line 19 identifications. For example, assuming that a system is designed for initiating the counting sequence with the 5th horizontal flyback pulse of each field, erroneously initiating the counting sequence with the fourth or sixth flyback pulse will cause line 18 or 20 to be mistakingly decoded as line 19. Since only line 19 contains the transmitted reference information, the control circuitry will, depending on the design of the system, set the receiver in response to incorrect input data or be rendered inoperative altogether.

In order to overcome the foregoing problem, prior art line recognition systems, of which U.S. Pat. No. 3,780,218 to Rennick is exemplary, conventionally employ a circuit arranged for integrating the composite sync signal in order to appropriately initiate the counting sequence. The integrator is normally designed for developing an output signal achieving a particular threshold level at a predetermined point during the vertical sync pulse interval. In response to achieving this threshold level, a sensing circuit, such as a monostable flip-flop, is operative for enabling the counter for counting subsequently occurring horizontal flyback pulses. Typically, the integrator threshold voltage level is achieved during the fourth horizontal scanning line so that the counter is enabled for counting beginning with the horizontal flyback pulse corresponding to the fifth scanning line. In such systems, an output count of 15 would be decoded for identifying line 19. The foregoing process would, of course, be repeated for each field of the transmitted television signal whereby line 19 would be repetitively identified by initiating the counting sequence at corresponding points in the vertical sync pulse interval and suitably decoding the counter output.

While, under ideal conditions, the integrator type system referred to above performs adequately, it is often susceptable to noise which can severely reduce its effectiveness. For example, high frequency noise superimposed on the relatively broad vertical sync pulses results in an integrated output exhibiting excessive jitter and characterized by randomly occurring peaks and valleys along its slope. As a consequence, the count initiating threshold level is developed in an unpredictable manner whereby the counting sequence is likely to be initiated incorrectly. As previously explained, an erroneously initiated counting sequence will produce a faulty identification of line 19. Low frequency noise may also adversely affect the operation of an integrator initiated line 19 recognition system. In this regard, integrated low frequency noise often closely resembles the integrated vertical sync pulses. Therefore, the introduction of low frequency noise into the composite sync signal between, for example, two adjacent horizontal sync pulses may be interpreted by the recognition system as a vertical sync pulse interval such that the counting sequence would again be erroneously initiated. And, as before, the result is an incorrect identification of line 19. The present invention provides a line 19 recognition circuit largely overcoming the foregoing problems.

SUMMARY OF THE INVENTION

In view of the foregoing, it is a general object of the present invention to provide an improved recognition system useful in association with a television receiver for identifying the 19th horizontal scanning line of each field of a transmitted television signal.

More particularly, it is an object of the present invention to provide a line 19 recognition system of the foregoing type having improved noise immunity characteristics.

In accordance with these and other objects, the line 19 recognition system of the present invention comprises means for sensing the logical characteristics of the composite sync signal of a transmitted television signal at predetermined time intervals during each horizontal scanning line thereof. A counter is responsive to the sensed logical characteristics for advancing to a preselected state whenever the sensed logical characteristics satisfy a predetermined relationship. From its preselected state, the counter counts subsequently occurring horizontal scanning lines which count is then decoded for identifying the 19th horizontal line. Means are also provided for identifying line 19 during any field in which the predetermined relationship is not satisfied in accordance with the last 19 identification resulting from satisfaction of the predetermined relationship.

BRIEF DESCRIPTION OF THE DRAWINGS

FIG. 1 is a block diagram generally illustrating a line 19 recognition circuit constructed in accordance with the present invention.

FIG. 2 shows various pertinent waveforms useful in understanding the general operating characteristics of the system of the present invention.

FIG. 3 is a block diagram illustrating a preferred embodiment of the timing circuit shown generally in FIG. 1.

DESCRIPTION OF THE PREFERRED EMBODIMENT

Figure 4:
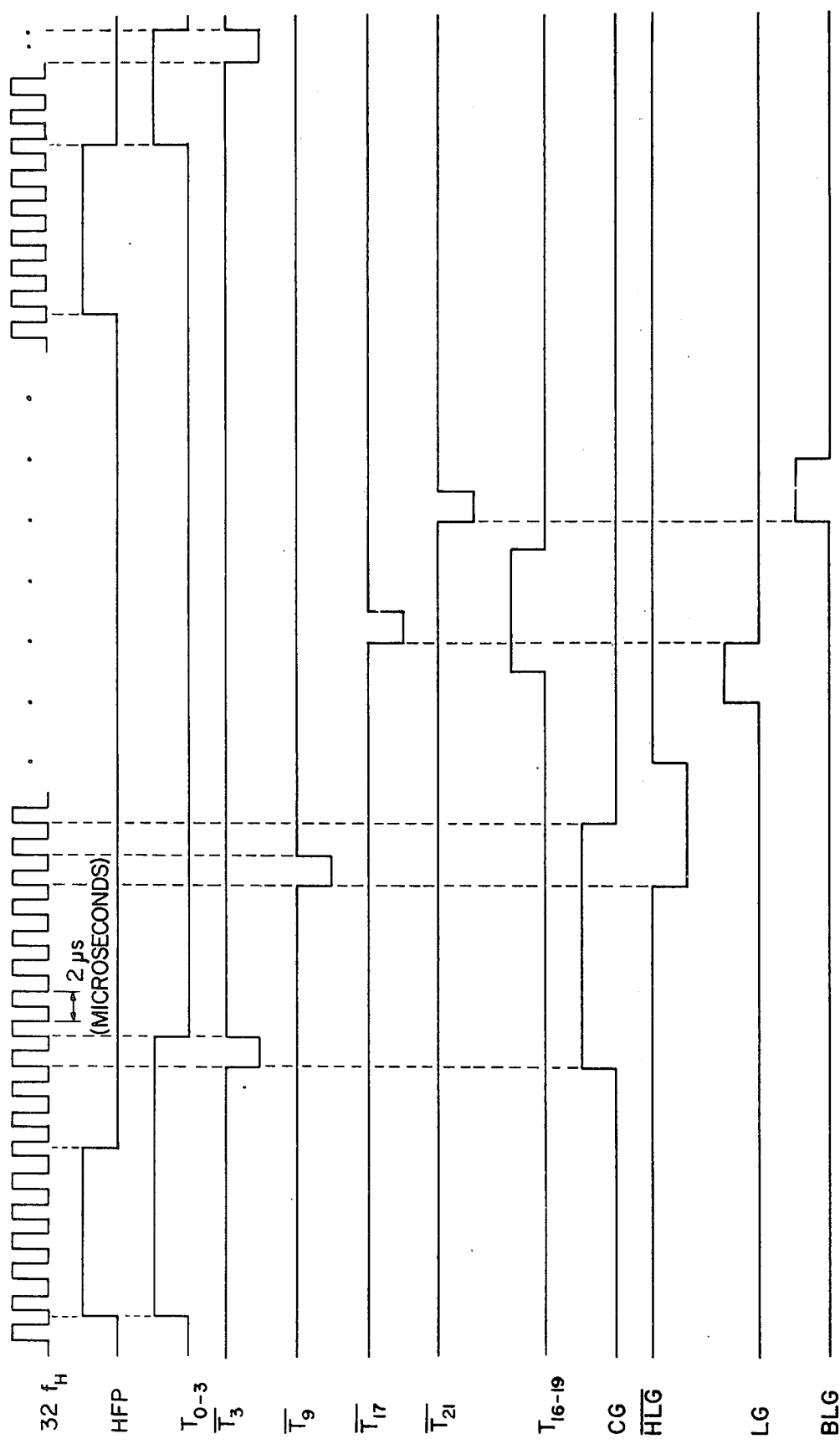
FIG. 4 illustratively depicts the input and output waveforms characterizing the timing circuit shown in FIG. 3.

Referring now to the drawings, a block diagram of a preferred form of the system of the present invention is illustrated in FIG. 1. Although not shown in conjunction with its operating environment, it will be appreciated that the illustrated system is intended to be integrated within and thereby operate in association with a conventional television receiver. As such, various signals developed in diverse sections of the television receiver are available to facilitate performance of the system's functions. In particular, these signals include the horizontal flyback pulses developed in the horizontal deflection system of the receiver, the composite sync signal produced in the sync separator section of the receiver and the vertical blanking pulses developed in the vertical deflection section of the receiver.

With further reference to FIG. 1, it will be observed that the illustrated system includes a timing circuit 10 having one input connected to a clock 12 and a second input connected for receiving the horizontal flyback pulses HFP. The horizontal flyback pulses are also coupled to inputs of a recognition circuit 14 and a carryover circuit 16. In addition, recognition circuit 14 includes inputs connected for receiving timing signals developed at the output of timing circuit 10 as well as the composite sync signal. Carryover circuit 16 includes additional inputs connected for receiving the vertical blanking signal, timing signals developed at the output of timing circuit 10 and a final input coupled to the output of recognition circuit 14. Lastly, the output of carryover circuit 16, on which is developed a line 19 recognition signal, is coupled to a utilization means 18 including signal processing circuitry suitable for controlling the performance of the television receiver in accordance with a transmitted VIR signal.

Before proceeding further with a description of the operation of the system shown in FIG. 1 it is considered desirable to initially examine the waveforms illustrated in FIG. 2. In accordance with present television broadcasting standards, a single frame of video information consists of two interlaced fields of horizontal scanning lines. One of the fields consists of a scan of all even numbered scanning lines, hereinafter referred to as the even field, whereas the other field constitutes a scan of all odd numbered scanning lines, hereinafter referred to as the odd field. The waveforms shown in the top two rows of FIG. 2 represent portions of the composite sync signals for successive even and odd fields. With regard to the even field, the last horizontal sync pulse $h_1$ of the immediately succeeding field is followed after one horizontal scanning line H by a series of six equalizing pulses and then by a serrated vertical pulse and finally by another group of six equalizing pulses. Three of the ensuing horizontal synchronizing pulses are shown beginning one-half after the final equalizing pulse. The synchronizing signals comprising the odd field are generally similar in nature to that of the even field except that the initial equalizing pulse interval follows the last horizontal synchronizing pulse $h_2$ of the immediately succeeding field by one-half line. Also, the initial horizontal synchronizing pulse following the second equalizing interval is spaced a full horizontal line from the final equalizing pulse. The horizontal scanning lines for each field are correspondingly numbered L1, L2, L3, etc. wherein it will be observed that the equalizing and vertical pulses of the respective fields are offset from each other by one-half line. It will, of course, be appreciated that the purpose of the horizontal synchronizing pulses is to synchronize the receiver's horizontal deflection system whereas the vertical sync pulse controls the vertical deflection system.

The horizontal deflection system of the television receiver produces a horizontal flyback pulse at the beginning of each horizontal scanning line. These horizontal flyback pulses and their relationship to the composite sync signal are illustrated in the third row of FIG. 2. It will be noted that each horizontal scanning line corresponds to a single horizontal flyback pulse so that a particular scanning line can be conveniently identified by counting horizontal flyback pulses. As mentioned previously, the difficulty arises in establishing a reference point from which to initiate the counting sequence. The final waveform illustrated in FIG. 2 represents the vertical blanking pulse used to blank the television raster during the vertical retrace interval. It will be observed that the transition in the vertical blanking pulse is variable by one-half line depending upon whether the even or odd field of the frame is being transmitted.

The general operation of the system shown in FIG. 1 will now be described with reference to the waveforms illustrated in FIG. 2. Recognition circuit 14, under the control of timing circuit 10, samples the composite sync signal for two short time intervals during each horizontal scanning line of the transmitted television signal. When the sampled values are characterized by a particular sequence of logic levels and transitions, a decision is made to count subsequently occurring horizontal flyback pulses, which count is then decoded to identify line 19.

More specifically, the composite sync signal occurring during each horizontal scanning line is initially sampled during a short interval immediately following the corresponding horizontal flyback pulse and secondarily during an interval including the half-line point of the line. Thus, the composite sync signal of each line is firstly sampled at a point corresponding to point a of line 4 and secondarily at a point corresponding to b. The count initiating sequence requires that the composite sync signal exhibit the following characteristics for ten consecutive samples: (1) logically high, (2) a logical transition, (3) logically high, (4) a logical transition, (5) logically high, (6) a logical transition, (7) logically low, (8) a logical transition, (9) logically low and (10) a logical transition. It will be observed that this sequence can only be satisfied during a vertical pulse and its following equalizing pulse interval and is completed prior to the occurrence of the horizontal flyback pulse corresponding to line 9. Thus, by counting horizontal flyback pulses beginning with the pulse corresponding to line 9 any subsequent line can be conveniently identified by suitably decoding the resulting count. In particular, line 19 containing the VIR signal can be so identified.

To further illustrate the count initiating sequence assume, for purposes of example, that line 4 is currently being sampled. The first test of the sequence is satisfied since the composite sync signal is at a logically high level at point a. Also, the second test is satisfied since a logical transition has occurred at point b. During line 5 the composite sync signal is characterized by a logically high level at point c and a logical transition at point d. Similarly, during line 6 the composite sync signal at point e is logically high and a logical transition occurs at point f. Accordingly, the first six tests of the count initiating sequence have been satisfied. Proceeding to line 7, the logical level of the composite sync signal at point g is low whereas a logical transition is present at point i. And finally, during line 8 the composite sync signal is logically low at point j and exhibits a logical transition at point k. The count initiating sequence has now been completely satisfied and recognition circuit 14 proceeds to count horizontal flyback pulses beginning with the pulse corresponding to line 9. Significantly, it will be noted that the interval comprising lines 4-8 is the only portion of the composite sync signal capable of satisfying the count initiating sequence. Therefore, if the sequence is satisfied during a particular field counting will always begin with line 9.

Due to the stringent requirements for satisfying the count initiating sequence, the counting sequence for identifying line 19 may not be initiated during any given field. Carryover circuit 16 is therefore provided to insure that a line 19 signal is generated eventhough the count initiating sequence has not been satisfied. Briefly, carryover circuit 16 memorizes the relative position of the last line 19 identification by recognition circuit 14 and compares the memorized data with an accumulated count of horizontal flyback pulses, the latter counting sequence being initiated by the vertical blanking signal VB developed by the vertical deflection system of the receiver. Upon achieving an equality comparison, carryover circuit 16 couples a suitable line 19 recognition signal to utilization means 18. Since the information stored in carryover circuit 16 is updated each time recognition circuit 14 identifies line 19, the output of carryover circuit 16 corresponds to the present line 19 identification by recognition circuit 14 or the last line 19 identification in the case where a line 19 count initiating sequence has not been satisfied for a particular field.

A more detailed description of the functional elements generally shown in FIG. 1 will now be provided. Referring, therefore, to FIG. 3 a preferred embodiment of timing circuit 10 includes a conventional 5-stage binary counter 20 having a clock input and a reset input. The clock input is coupled to clock 12 which comprises a source of continuous clock signals having a frequency at least several times the horizontal scanning rate. In the preferred embodiment of the invention, clock 12 develops a clock signal having a frequency of 503KHz and a period of 2 microseconds. The horizontal flyback pulses are coupled through a pulse shaper 22 to the reset input of binary counter 20. Pulse shaper 22 may comprise a conventional hysteresis circuit such as a schmitt trigger for suitably shaping the horizontal flyback pulses. Finally, the states of counter 20 are appropriately decoded by a decoder 24 whose output consists of the timing signals supplied to recognition circuit 14 and carryover circuit 16.

The timing signals developed at the output of decoder 24 are illustrated in FIG. 4. Initially, at the beginning of each horizontal scanning line the horizontal flyback pulse resets counter 20 to its zero state. Subsequently, decoder 24 decodes various states of the counter for developing the illustrated timing signals. Accordingly, timing signal $T_{0-3}$ comprises a positive going pulse occurring during states 0-3 of the counter. Signals $\overline{T}_3$ and $\overline{T}_9$ are negative going pulses occurring during states 3 and 9 respectively of the counter. Similarly, timing signals $\overline{T}_{17}$ and $\overline{T}_{21}$ are negative going pulses occurring during states 17 and 21 of counter 20. Timing signal $T_{16-19}$ is a positive going pulse occurring during states 16-19 of the counter and signal $\overline{HLG}$ (half line gate) is a negative going pulse occurring during states 9-12. Lastly, states 3-10 of counter 20 are decoded for providing a positive going chrominance gate CG, states 15-16 are decoded for providing a luminance gate LG and states 21-22 are decoded for providing a black level gate BLG. The latter three signals appropriately dissect the VIR signal on line 19 before application to utilization means 18. It will be appreciated that the foregoing timing signals are developed during each horizontal scanning line in response to the application of a horizontal flyback pulse to the reset input of counter 20.

Figure 5A:
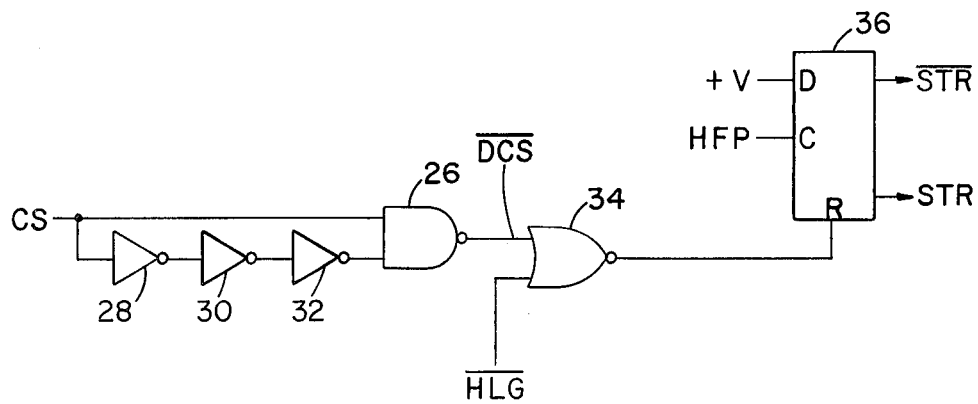
FIGS. 5A and 5B illustrate a preferred logical formulation of the recognition circuit block shown in FIG. 1.
Figure 5B:
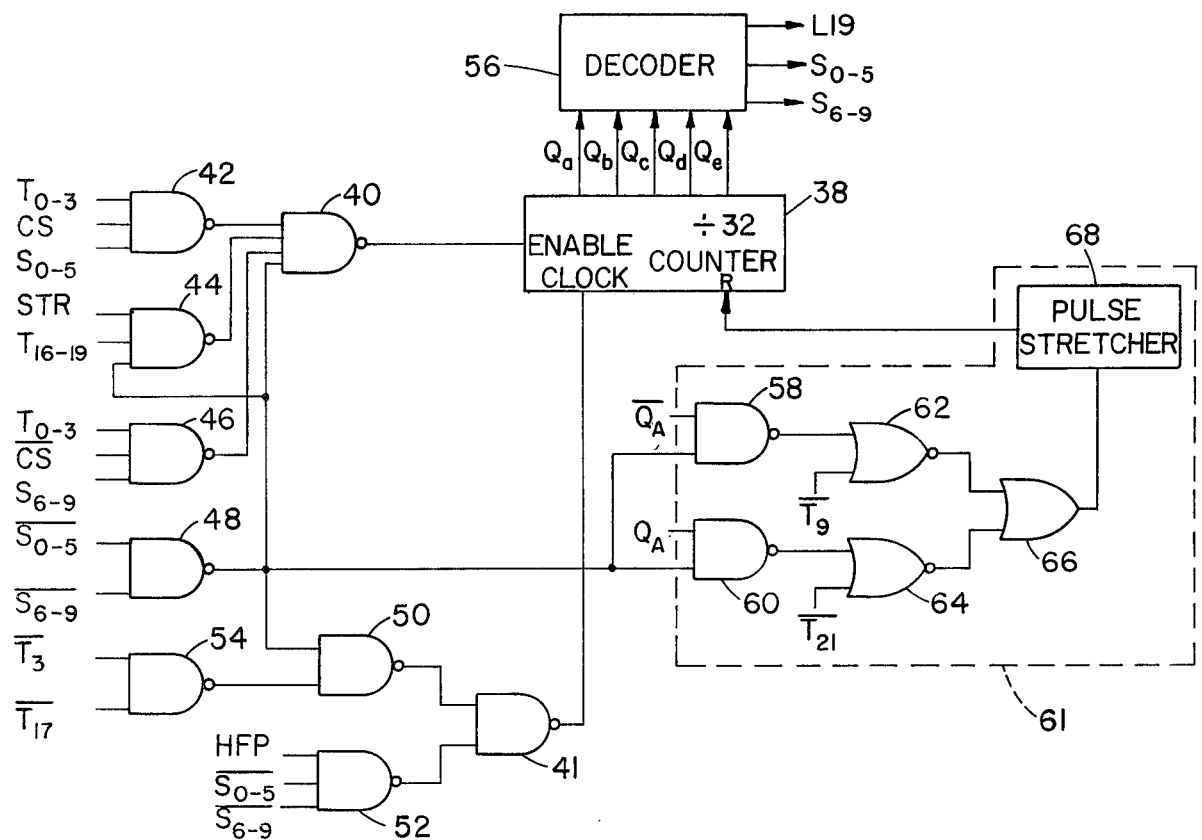

A preferred embodiment of recognition circuit 14 is illustrated in FIGS. 5A and 5B. As shown, recognition circuit 14 consists of two portions; the first portion being illustrated in FIG. 5A and comprising a sync transition detector. The remainder of recognition circuit 14 is illustrated in FIG. 5B. Referring to FIG. 5A, the sync transition detector includes a digital differentiating circuit comprising a NAND gate 26 having one input connected for receiving the composite sync signal CS. The composite sync signal is also applied to the second input of NAND gate 26 through three inverters 28, 30 and 32. The output of NAND gate 26, which is coupled to one input of a NOR gate 34, thus comprises a negative going pulse $\overline{DCS}$ having a duration measured by the combined delay of inverters 28, 30 and 32 and generated in response to positive going edges of the composite sync signal. The remaining input of NOR gate 34 is connected for receiving timing signal $\overline{HLG}$ from timing circuit 10. The sync transition detector finally includes a storage element comprising a "D" type flip-flop 36 for indicating the occurrence of a transition in the composite sync signal during the half line gate $\overline{HLG}$. A source of a logical one level signal is coupled to the D input of flip-flop 36 and the flip-flop's clock input is connected for receiving the horizontal flyback pulses. The output of NOR gate 34 is coupled to the reset input of flip-flop 36 whose Q output STR, when at a 1 level, is indicative of the occurrence of a transition in the composite sync signal during the half line gate.

Figure 6A:
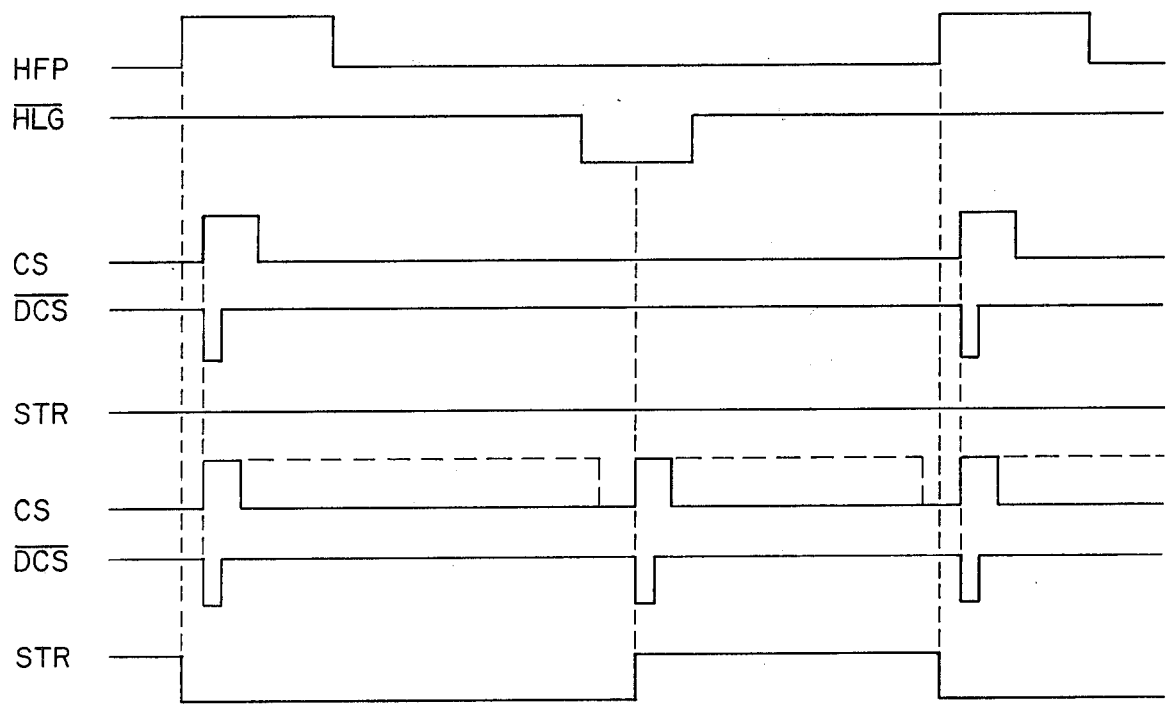
FIGS. 6A and 6B illustrate the input and output waveforms associated with the circuitry shown in FIGS. 5A and 5B respectively.

FIG. 6A illustrates the operation of the sync transition detector in response to a horizontal scanning line including no logical transitions, row 3, and to a horizontal scanning line including a logical transition corresponding either to an equalizing pulse or to a serration of the vertical sync pulse, row 6. At the beginning of each horizontal scanning line a horizontal flyback pulse clocks flip-flop 36 to state 1 wherein its $\overline{Q}$ output STR is zero. A subsequently occurring transition in the composite sync signal is represented by the condition wherein flip-flop 36 is reset to its 0 state so that output STR equals 1. This occurs in response to a 1 level signal at the output of NOR gate 34 resetting the flip-flop. Furthermore, since a 1 level signal can only be developed at the output of NOR gate 34 when timing signal $\overline{HLG}$ is logically low, the output of NOR gate 34 can only reset flip-flop 36 during the duration of the pulse defining signal $\overline{HLG}$. With respect to the composite sync signal shown in row 3 of FIG. 6A, it will be observed that the inverted and differentiated composite sync signal $\overline{DCS}$ is logically high during the duration of timing signal $\overline{HLG}$. Consequently, the output of NOR gate 34 remains low and a reset pulse is not developed so that signal STR remains low. However, referring to rows 6–8 of FIG. 6A, it will be noted that a negative going pulse $\overline{DCS}$ is produced at the output of NAND gate 26 in response to the positive going edge of either an equalizing pulse or the serration of a vertical sync pulse. The negative going pulse $\overline{DCS}$, which temporarily overlaps the timing signal $\overline{HLG}$, results in the production of a reset pulse at the output of NOR gate 34 which resets flip-flop 36 to its 0 state causing output STR to go logically high. The resulting 1 level STR signal is indicative of the fact that a transition has occurred during timing signal $\overline{HLG}$ in the composite sync signal. It is to be noted that a reset pulse is developed at the output of NOR gate 34 only in response to a transition in the composite sync signal. This feature provides a convenient facility for distinguishing valid sync signals from low frequency noise which could otherwise affect system operation.

FIG. 5B illustrates the remainder of recognition circuit 14. With reference to the figure, a 5-stage binary counter 38 includes an enable input coupled to the output of a NAND gate 40 and a clock input coupled to the output of another NAND gate 41. NAND gate 40, in turn, includes inputs coupled to the outputs of a plurality of interfacing NAND gates 42, 44, 46 and 48. NAND gate 41 has one input coupled to the output of a NAND gate 50 and a second input coupled to the output of a NAND gate 52. A final interfacing NAND gate 54 supplies one input of NAND gate 50, its other input being supplied from the output of NAND gate 48.

Figure 6B:
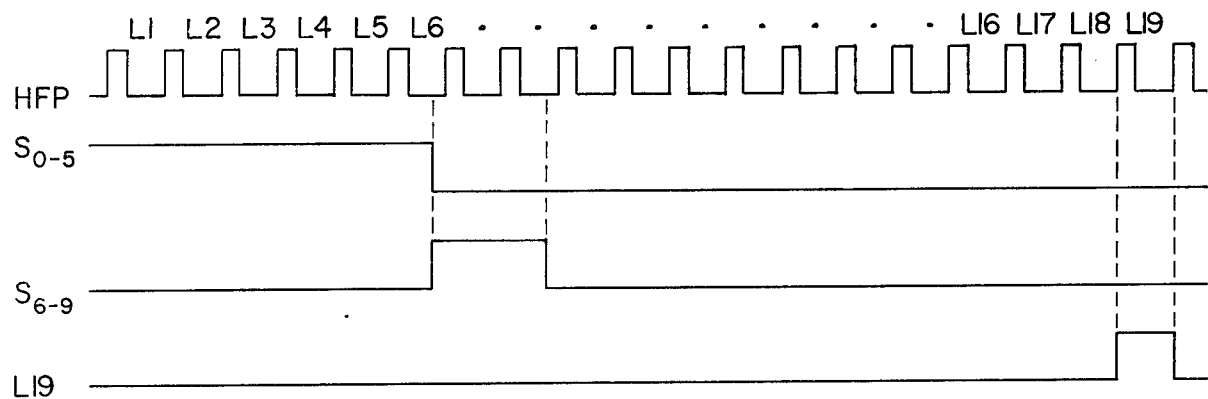

A decoder 56 is connected for decoding the output states $Q_a$–$Q_e$ of counter 38 and, as will be explained in further detail hereinafter, develops a plurality of output signals as illustrated in FIG. 6B. In particular, decoder 56 is suitably configured for developing, during each field of a transmitted television signal, an output signal $S_{0-5}$ identifying states 0–5 of counter 38 and a signal $S_{6-9}$ identifying states 6–9 of the counter. Finally, a signal $L_{19}$, corresponding to state 21 of counter 38, identifies horizontal scanning line 19. Signal $S_{0-5}$ in association with the composite sync signal and timing signal $T_{0-3}$ from timing circuit 10 are applied to the inputs of NAND gate 42. Signal $S_{6-9}$ in association with the inverted composite sync signal $\overline{CS}$ and timing signal $T_{0-3}$ are applied to the inputs of NAND gate 46. The sync transition signal STR from flip-flop 36 along with a timing signal $T_{16-19}$ and the output of NAND gate 48 are all coupled to the inputs of NAND gate 44. NAND gate 48 has inputs connected for receiving signal $\overline{S}_{0-5}$ and signal $\overline{S}_{6-9}$ and NAND gate 54 receives timing signals $T_3$ and $\overline{T}_{17}$. Finally, NAND gate 52 has inputs coupled for receiving the horizontal flyback pulses HFP as well as signals $\overline{S}_{0-5}$ and $\overline{S}_{6-9}$.

The output of NAND gate 48 is also coupled to a pair of NAND gates 58 and 60 of a counter reset circuit 61. The remaining input of NAND gate 58 is connected to the $\overline{Q}_a$ output of counter 38 whereas the remaining input of NAND gate 60 is coupled to output $Q_a$. The outputs of NAND gate 58 and 60 supply the first inputs of a pair of NOR gates 62 and 64, the second inputs of NOR gates 62 and 64 being connected for receiving timing signals $T_9$ and $\overline{T}_{21}$ respectively. An OR gate 66 combinatorily combines the outputs of NOR gates 62 and 64 and is, through a pulse stretcher 68, connected to the reset terminal of counter 38.

Operation of the circuit shown in FIG. 5B is most conveniently explained with the aid of the waveforms shown in FIG. 6B and the composite sync signal illustrated in the first two rows of FIG. 2. Basically, NAND gates 42, 44 and 46 are connected for causing NAND gate 40 to enable counter 38 during the sampling points of the count initiating sequence according to the characteristics of the composite sync signal. While so enabled, $T_3$ and $\overline{T}_{17}$ timing pulses are coupled through NAND gates 54, 50 and 41 to the clock input of counter 38 causing it to advance two states during each line in which the count initiating sequence is satisfied. Therefore, counter 38 will reach a count of 10 during horizontal line 8 for indicating satisfaction of the count initiating sequence. Should the composite sync signal be characterized by an improper value, reset circuit 61 develops a signal at the output of pulse stretcher 68 resetting counter 38 for re-initiating the recognition sequence. Upon satisfying the count initiating sequence NAND gate 48 causes NAND gate 40 to maintain counter 38 enabled while subsequently occurring horizontal flyback pulses are coupled through NAND gates 52 and 41 for clocking the counter. State 21 of counter 38 is decoded by decoder 56 for identifying line 19 which is then coupled to carryover circuit 16.

More particularly, at the beginning of the fourth horizontal scanning line of either an even field or an odd field counter 38 is characterized by a 0 state so that signal $S_{0-5}$ is 1 and signal $S_{6-9}$ is 0. Therefore, during the initial sampling interval defined by the duration of timing signal $T_{0-3}$ the output of NAND gate 42 is 0 if the composite sync signal is at a 1 level. Consequently, the output of NAND gate 40 goes high enabling counter 38. While so enabled, a $T_3$ timing pulse is coupled through NAND gate 54 to one input of NAND gate 50. Since the other input of NAND gate 50 is maintained logically high for the duration of signal $S_{0-5}$ by the output of NAND gate 48, NAND gate 50 couples the $\overline{T}_3$ timing pulse to one input of NAND gate 41. Finally, NAND gate 41 couples the $\overline{T}_3$ timing pulse for clocking counter 38 since its other input is also maintained high for the duration of signal $S_{0-5}$ by the output of NAND gate 52. Thus, if the composite sync signal is characterized by a logically high level at point a in FIG. 2, counter 38 is advanced one state.

Next, NAND gate 44 causes NAND gate 40 to enable counter 38 during the sampling interval defined by the duration of timing signal $T_{16-19}$ (corresponding to point b) if a 1 level sync transition signal STR from flip-flop 36 is present. While enabled in response to NAND gate 44, a $\overline{T}_{17}$ timing pulse is coupled from NAND gate 54 to NAND gate 41 through NAND gate 50. Timing pulse $\overline{T}_{17}$ is then coupled for clocking counter 38 to state 2. Thus, the occurrence of a sync transition during the fourth horizontal scanning line at point b results in counter 38 being advanced to state 2. A similar sequence of operations is completed during the fifth and sixth horizontal scanning lines whereby counter 38 is advanced to state 6 assuming that the composite sync signal is characterized by the illustrated logic levels. The foregoing is indicative of the condition wherein the first six tests of the count initiating sequence have been satisfied.

During the seventh horizontal scanning line signal $S_{0-5}$ is low and signal $S_{6-9}$ is logically high. Consequently, during the first sampling period of the seventh horizontal scanning line, defined by timing pulse $T_{0-3}$ (point g in FIG. 2), NAND gate 46 causes NAND gate 40 to enable counter 38 if the composite sync signal is logically low or, stated otherwise, if the inverted composite sync signal $\overline{CS}$ is logically high. While enabled by NAND gates 40 and 46, a $\overline{T}_3$ timing pulse is coupled through NAND gates 54, 50 and 41 for clocking counter 38 which advances to state 7. During the next sampling interval, point i defined by the $T_{16-19}$ timing pulse of the seventh horizontal line, counter 38 is enabled by NAND gates 44 and 40 upon the occurrence of a 1 level sync transition signal STR. And, as before, a $\overline{T}_{17}$ timing pulse is coupled from NAND gate 54 for clocking counter 38 to state 8. Assuming proper composite sync logic levels, a similar operational sequence is repeated during the eighth horizontal scanning line wherein counter 38 is advanced to state 10 indicating that the count initiating sequence has been fully satisfied.

Upon achieving state 10, the outputs $Q_a-Q_e$ of counter 38 are decoded by decoder 56 such that signals $S_{0-5}$ and $S_{6-9}$ are both 0. As a result, counter 38 is maintained enabled by NAND gate 40 in response to the 0 level signal developed at the output of NAND gate 48. Furthermore, the 0 level signal at the output of NAND gate 48 results in a 1 level signal being applied from NAND gate 50 to one input of NAND gate 41. NAND gate 41 is therefore effective for coupling horizontal flyback pulses from NAND gate 52 to the clock terminal of counter 38. Therefore, the horizontal flyback pulses beginning with the pulse corresponding to the ninth horizontal scanning line advance counter 38 one state for each line. The 19th horizontal scanning line, containing the VIR signal, can now be reliably and conveniently identified by decoding state 21 of counter 38.

In the event that a particular test of the count initiating sequence is not satisfied during any given scanning line, reset circuit 61 is operable for resetting counter 38 to state 0 wherein the entire recognition sequence is re-initiated. For example, initially assume that the first test of the count initiating sequence (i.e., at point a) has been satisfied so that counter 38 is in state 1. Under these conditions, the lower inputs of both NAND gates 58 and 60 are at a logical 1 level. Input $Q_a$ of NAND gate 60 is also logical 1 so that the gate's output is at 0 whereas the $\overline{Q}_a$ input to NAND gate 58 is 0 resulting in a logical 1 level signal at the gate's output. And now, assuming that the second test (i.e., at point b) is not satisfied, counter 38 remains in state 1. Therefore, in response to timing pulse $\overline{T}_{21}$, NOR gate 64 couples a positive going reset pulse through OR gate 66 and pulse stretcher 68 to the reset terminal of counter 38. In a similar fashion, NOR gate 64 develops a reset pulse in response to the failure of any other even numbered tests (i.e., the test performed at point b, d, f, i and k) of the count initiating squence.

For purpose of further illustration, assume next that the first two tests of the count initiating sequence have been satisfied so that counter 38 is in state 2. In state 2, output $Q_a$ is 0 and $\overline{Q}_a$ is 1 so that the output of NAND gate 58 is 0 and the output of NAND gate 60 is 1. Upon failure of the third test (i.e., at point c), NOR gate 62 couples timing pulse $\overline{T}_9$ through OR gate 66 and pulse stretcher 68 to the reset terminal of counter 38 for resetting the counter to state 0. Similarly, NOR gate 62 develops a reset pulse in response to the failure of any of the other odd numbered tests (i.e., those tests performed at points a, c, e, g and j) of the count initiating sequence. After counter 38 is advanced to state 10, representing satisfaction of the count initiating sequence, the output of NAND gate 48 goes low disabling the reset circuit thereby permitting uninterrupted counting of the subsequently occurring horizontal flyback pulses.

As mentioned previously, due to the stringent conditions imposed by the count initiating sequence a line 19 signal may not be developed at the output of decoder 56 during each field of a transmitted television signal. Carryover circuit 16, shown in detail in FIG. 7 alleviates this situation by developing a line 19 output identification signal even in cases where the recognition sequence has not been satisfied by recognition circuit 14. In general terms, carryover circuit 16 stores the count corresponding to the last valid line 19 signal developed by decoder 56 of recognition circuit 14 and, during subsequent fields, compares the stored value to an independently derived horizontal line count. Satisfying the comparison then produces an output signal identifying line 19. It will therefore be appreciated that line 19 will be identified with the same accuracy as the last valid line 19 identification resulting from an output of decoder 56.

Figure 7:
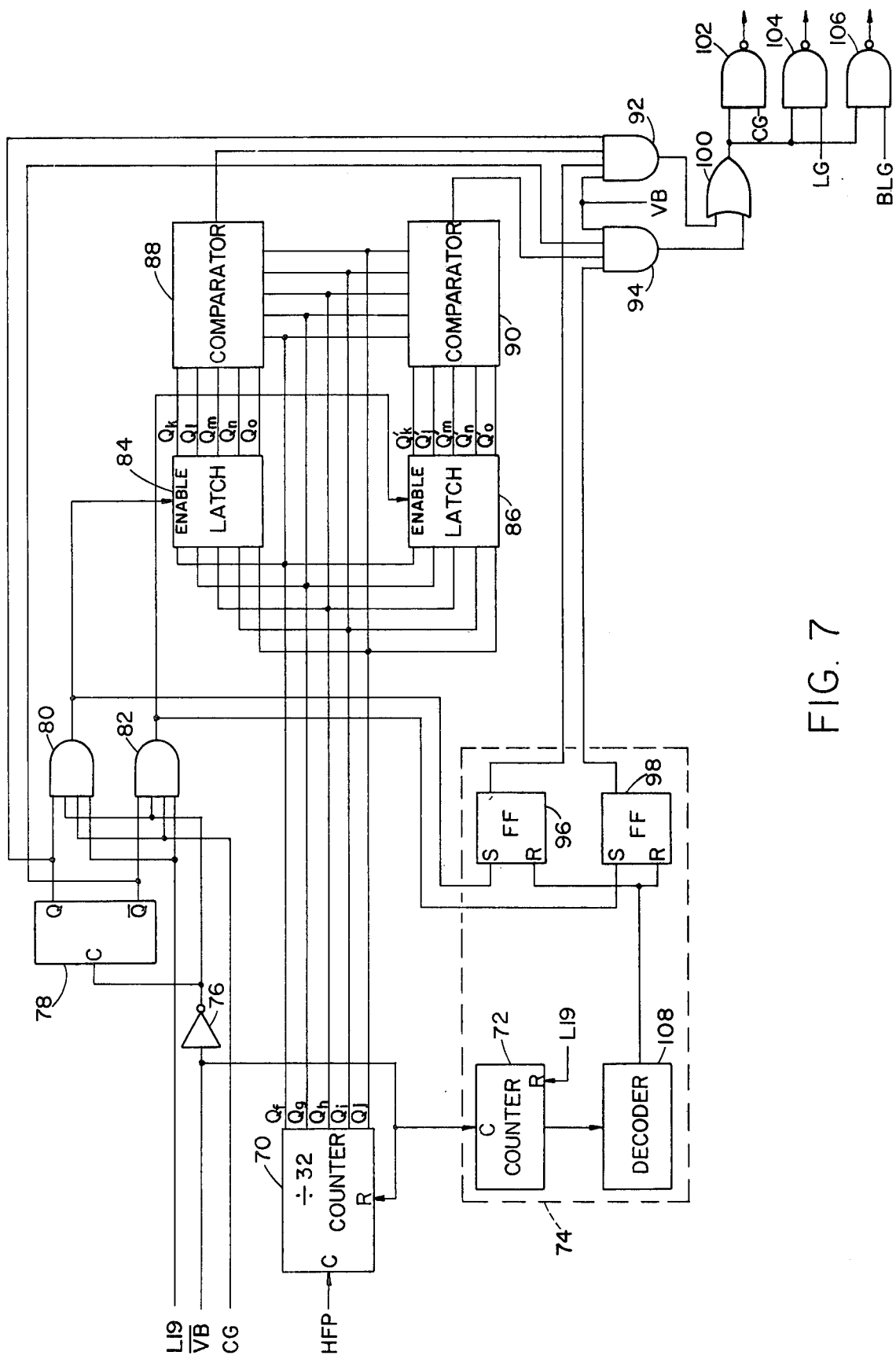
FIG. 7 illustrates a logical embodiment of the carryover circuit shown generally in FIG. 1.

Referring now to FIG. 7, carryover circuit 16 comprises a 5-stage binary counter 70 having a clock input coupled for receiving horizontal flyback pulses and a reset input connected to a line developing the inverted vertical blanking signal $\overline{VB}$. Signal $\overline{VB}$ is also coupled to the clock input of a counter 72 of a shut-down circuit 74 and through an inverter 76 to the clock input of a steering flip-flop as well as to the inputs of a pair of AND gates 80 and 82. AND gates 80 and 82 further receive at their inputs the line 19 identification signal from decoder 56 and the chrominance gate CG from timing circuit 10. The final input of AND gate 80 is supplied from the Q output of flip-flop 78 and the final input of AND gate 82 is supplied by the $\overline{Q}$ output of flip-flop 78.

The outputs $Q_f-Q_j$ of counter 70 are connected in parallel to a first latch circuit 84 and to a second latch circuit 86. Also, outputs $Q_f-Q_j$ are connected in parallel to the input of a first comparator 88 and to the inputs of a second comparator 90. The outputs $Q_k-Q_o$ of latch circuit 84 are coupled to the remaining inputs of comparator 88 whereas the outputs $Q'_k-Q'_o$ of latch circuit 86 are coupled to the remaining inputs of comparator 90. The outputs of comparators 88 and 90 supply, respectively, a pair of AND gates 92 and 94 to which are also coupled the vertical blanking signal VB. The remaining inputs of AND gate 92 are supplied from the Q output of flip-flop 78 and the Q output of a flip-flop 96 of shutdown circuit 74. Analogously, the remaining inputs of AND gate 94 are supplied from the $\overline{Q}$ output of flip-flop 78 and the Q output of a flip-flop 98 of shutdown circuit 74. Finally, the outputs of AND gates 92 and 94 are combined in an OR gate 100 on whose output the line 19 identification signal ultimately applied to utilization means 18 is developed. As shown, the line 19 signal may be divided by the chrominance gate CG, luminance gate LG and black level gate BLG by means of NAND gates 102, 104 and 106 to segment the VIR signal into its component parts.

Shut-down circuit 74 in addition to counter 72, whose reset input is connected for receiving the line 19 identification signal from decoder 56, includes a decoder 108 for decoding the output of counter 72. The output developed by decoder 108 is, in turn, coupled to the reset terminals of flip-flops 96 and 98, the set input of flip-flop 96 being supplied from the output of AND gate 80 and the set input of flip-flop 98 being supplied from the output of AND gate 82. The outputs of AND gates 80 and 82 are also coupled to the enable input of latches 84 and 86 respectively for enabling storage of outputs $Q_f$-$Q_j$ of counter 70.

In operation, counter 70 is reset during each field of a received television signal by the inverted vertical blanking pulse $\overline{VB}$. Although the vertical blanking pulse is typically generated near the center of the third segment of the serrated vertical pulse, its precise position is offset from field to field by one-half horizontal scanning line due to the offset in the vertical pulse between odd and even fields. Therefore, during an odd field, the vertical blanking pulse will correspond to the solid line shown in FIG. 2 whereas its position will correspond to the dotted line for an even field. As a result, the count developed by counter 70 in response to horizontal flyback pulses may not be the same for both odd and even fields. To overcome this problem, carryover circuit 16 comprises dual circuitry for storing and comparing data. In particular, latch 84, comparator 88 and AND gate 92 are operative during one field of information and latch 86, comparator 90 and AND gate 94 are operative during the alternate field.

With further reference to FIG. 7, counter 70 begins counting horizontal flyback pulses in response to the inverted vertical blanking pulse $\overline{VB}$ associated with a given field. The inverted vertical blanking signal $\overline{VB}$ is also coupled through inverter 76 and toggles flip-flop 78 to a first state wherein, for example, its Q output is one. Thereafter, upon coincidence of the line 19 signal from decoder 56 and the chrominance gate CG a signal is developed at the output of AND gate 80 enabling latch 84 to sample and store the count represented by outputs $Q_f$-$Q_j$. Latch 86 remains inhibited due to the 0 level signal applied from the $\overline{Q}$ output of flip-flop 78 to AND gate 82. During the next occurring field, flip-flop 78 is again toggled by the inverted vertical blanking signal $\overline{VB}$ coupled thereto by inverter 76. As a result, upon coincidence of the line 19 signal from decoder 56 and the chrominance gate CG the output of AND gate 82 goes high enabling latch 86 to sample and store the data represented by outputs $Q_f$-$Q_j$. Both latches are now loaded with line 19 information, each corresponding to the count developed by counter 70 during successively occurring alternate fields. Now, during the next successively occurring field, flip-flop 78 is again toggled with its Q output going high. The 1 level signal developed at the Q output of flip-flop 78 is applied to the input of AND gate 92 along with the 1 level signal developed at the output of flip-flop 96 and the 1 level signal resulting from the vertical blanking signal VB. AND gate 94 is maintained inhibited by the 0 level signal developed at the $\overline{Q}$ output of flip-flop 78. Both comparators 88 and 90 continuously compare the output of latches 84 and 86 with the accumulated count represented by output $Q_f$-$Q_j$. Upon establishing equality between the stored data and the accumulated count, comparators 88 and 90 couple 1 level output signals to AND gate 92 and 94 respectively. However, since AND gate 94 is presently inhibited, only the output of AND gate 92 is coupled through OR gate 100 for identifying line 19.

Continuing with the next successive field, flip-flop 78 is again toggled with its $\overline{Q}$ output going high for enabling AND gate 94 and simultaneously inhibiting AND gate 92. During this field, therefore, the output of comparator 90, developed in response to an equality condition between the stored data and the accumulated count (represented by outputs $Q_f$-$Q_j$) is coupled by AND gate 94 to OR gate 100 for identifying line 19.

It will thus be observed that during alternate fields of the transmitted television signal steering flip-flop 78 enables alternate but identical sections of carryover circuit 16. In this matter any offset in the vertical blanking pulse, which initiates counter 70, occurring during alternate fields is accommodated without effecting the accuracy of the system.

It will be noted that counter 72 of shut-down circuit 74 is advanced in response to the inverted vertical blanking pulse $\overline{VB}$. However, each time a line 19 identification signal is developed at the output of decoder 56 counter 72 is reset to its 0 state. Should a line 19 signal not be developed at the output of decoder 56 for some predetermined number of fields, the output of decoder 108 will reset flip-flops 96 and 98 whose Q outputs consequently go low. The 0 level Q outputs of flip-flops 96 and 98 effectively inhibit AND gates 92 and 94 thereby shutting down operation of carryover circuit 16. It will be appreciated that carryover circuit 16 is shut down only after a predetermined number of unsuccessful attempts by recognition circuit 14 to identify line 19. In the preferred embodiment of the present invention, counter 72 comprises a 5-stage binary counter whose 63rd state is decoded by decoder 108 for shutting down carryover circuit 16.

What has been shown is a new and improved line 19 recognition circuit having improved immunity to both low and high frequency noise. The improved immunity characteristics are essentially achieved by requiring the satisfaction of a stringent count initiating sequence defined by the logical levels and transitions occurring in the composite sync signal. Due to the stringency of the count initiating sequence, a carryover circuit is provided for developing a line 19 identification signal whenever the count initiating sequence is not satisfied.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

What is claimed is:

1. In a television receiver of the type responsive to a transmitted television signal including a composite sync signal defining a plurality of horizontal scanning lines, a line recognition system for identifying a predetermined one of said horizontal scanning lines comprising:

means for sensing the logical characteristics of said composite sync signal at predetermined time intervals during each of said horizontal lines;

counting means advanceable to a preselected state in response to said logical characteristics satisfying a predetermined relationship, said counting means being connected for counting subsequently occurring horizontal scanning lines; and decoding means coupled for decoding the count developed by said counting means for developing a control signal identifying said predetermined line.

2. The line recognition system according to claim 1 including means for resetting said counting means in response to non-satisfaction of said predetermined relationship.

3. The line recognition system according to claim 2 wherein said television receiver includes means for developing horizontal flyback pulses each corresponding to one of said horizontal scanning lines and wherein said means for sensing comprises means for detecting, during each of said horizontal scanning lines, the logical level of said composite sync signal during a first timing interval occurring substantially immediately after the corresponding one of said horizontal flyback pulses and the presence of a logical transition of said composite sync signal during a second timing interval including the half-line point of the associated horizontal line.

4. The line recognition system according to claim 3 including means for advancing said counting means to said preselected state in response to a successively occurring predetermined sequence of said detected logical levels and logical transitions.

5. The line recognition system according to claim 4 wherein said counting means is connected for counting said horizontal flyback pulses in response to satisfaction of said predetermined sequence for counting said horizontal scanning lines.

6. The line recognition system according to claim 4 wherein said predetermined sequence of said detected logical levels and transitions is defined by the characteristics of the vertical sync pulse and immediately following equalizing pulse interval of said composite sync signal.

7. The line recognition system according to claim 6 wherein said predetermined sequence is defined during an interval comprising five horizontal scanning lines beginning with the fourth horizontal scanning line of each field of said television signal.

8. The line recognition system according to claim 1 including means responsive to said control signal for developing an output signal identifying said predetermined line independently of satisfaction of said predetermined relationship.

9. The line recognition system according to claim 8 wherein said means responsive to said control signal comprises:

second counting means for continuously counting the horizontal scanning lines of each field of said television signal;

first means for storing the count characterizing said second counting means upon development of said control signal; and first means for comparing said stored count characterizing said first means for storing with the count continuously accumulated by said second counting means for developing said output signal identifying said predetermined line in response to detection of a predetermined relationship between said stored count characterizing said first means for storing and said accumulated count.

10. The line recognition system according to claim 9 wherein said television receiver includes means for developing vertical blanking pulses for resetting said second counting means near the beginning of each field of said television signal, said line recognition system further comprising:

second means for storing the count characterizing said second counting means upon development of said control signal;

second means for comparing said stored count characterizing said second means for storing with the count continuously accumulated by said second counting means for developing said output signal identifying said predetermined line in response to detection of a predetermined relationship between said stored count characterizing said second means for storing and said accumulated count; and means responsive to said vertical blanking pulses for alternately enabling and inhibiting said first means for storing and comparing and said second means for storing and comparing during alternate fields of said television signal.

11. In a television receiver of the type having a line recognition system for identifying a predetermined horizontal scanning line of a transmitted television signal by counting horizontal scanning lines occurring subsequently of a reference point defined by the composite sync component of said television signal, the improvement comprising:

means for sampling preselected logical characteristics of said composite sync component at predetermined time intervals during each horizontal scanning line of said television signal; and means responsive to said means for sampling for determining said reference point according to the logical characteristics of said sampled composite sync component.

12. The improvement according to claim 11 wherein said means for determining comprises means for determining said reference point in response to the logical characteristics of a preselected number of successively occurring samples of said composite sync component satisfying a predetermined sequence of logical characteristics.

13. The improvement according to claim 12 wherein said predetermined sequence of logical characteristics includes at least some of the logical levels and logical transitions defining the vertical sync pulses and equalizing pulse intervals of said composite sync component.

14. In a television receiver, the method of identifying a predetermined horizontal scanning line of a transmitted television signal including a plurality of horizontal scanning lines comprising the steps of:

sampling the composite sync signal of said television signal at predetermined time intervals during each of said horizontal scanning lines;

comparing the logical characteristics of said sampled composite sync signal to a predetermined sequence of logical characteristics; and counting the horizontal scanning lines occurring subsequently to satisfying said comparing step for identifying said predetermined horizontal scanning line.

15. The method according to claim 14 wherein said predetermined sequence of logical characteristics is defined by the logical levels and transitions of the vertical sync pulse and equalizing pulse intervals of the composite sync signal of said television signal.

16. The method according to claim 14 including the steps of:
storing each identification of said predetermined horizontal scanning line resulting from said counting step; and
identifying said predetermined horizontal scanning line in accordance with the most current one of said stored identifications during each field of said television signal for which said comparison is not satisfied.

17. The method according to claim 15 wherein said television receiver includes means for developing horizontal flyback pulses each corresponding to one of said horizontal scanning lines and wherein said counting step comprises the step of counting the horizontal flyback pulses associated with each of said horizontal scanning lines.

18. The method according to claim 17 wherein said sampling step comprises the step of sampling the composite sync signal of said television signal during each of said horizontal lines at a first time interval occurring substantially immediately after the corresponding one of said horizontal flyback pulses and at a second time interval including the half-line point of the associated horizontal line.

19. The method according to claim 18 wherein said predetermined sequence of logical levels and transitions comprises ten successive ones of said samples of said composite sync signal exhibiting the characteristics of (1) a logically high level, (2) a logical transition, (3) a logically high level, (4) a logical transition, (5) a logically high level, (6) a logical transition, (7) a logically low level, (8) a logical transition, (9) a logically low level and (10) a logical transition.

* * * * *